No. 775,502. Patented November 22, 1904.

UNITED STATES PATENT OFFICE.

EDWARD J. SHEEHAN, OF PASADENA, CALIFORNIA, ASSIGNOR TO SAN GABRIEL VALLEY ESSENTIAL OIL COMPANY, OF PASADENA, CALIFORNIA, A CORPORATION OF CALIFORNIA.

PROCESS OF EXTRACTING OLEO-RESIN FROM THE PEEL OF CITRUS FRUITS.

SPECIFICATION forming part of Letters Patent No. 775,502, dated November 22, 1904.

Application filed June 18, 1903. Serial No. 162,100. (No specimens.)

*To all whom it may concern:*

Be it known that I, EDWARD J. SHEEHAN, a citizen of the United States, residing at Pasadena, Los Angeles county, State of California, have invented certain new and useful Improvements in Processes of Extracting Oleo-Resin from the Peel of Citrus Fruits, of which the following is a full, clear, and exact description.

My invention relates to the production of oleo-resin from the citrus class of fruits; and it consists of a new and improved process or method of extracting the oleo-resin from such fruits and in the purified product obtained therefrom.

Heretofore a class of essential oils has been obtained from the fresh peel of oranges and lemons by pressure which bursts the oil-cells, the oil being collected by various means. The best of these processes, so far as they are known, produce products classified as essential oils, but which are lacking, except perhaps to a minor but inappreciable extent, in the acid and neutral resins, particularly the latter, these acids possessing a flavoring power characteristic of the fresh fruit and supplementing the flavoring power of the citral in the peel of such fruits.

I have found as the result of repeated and long-continued use of my new process hereinafter described and by analyses of the product so obtained that the peel of orange and lemon in the class of citrus fruits contains, in addition to the large percentages of terpenes and aldehydes usually obtained, notable amounts of these flavoring-resins largely in excess of and differing in character as a whole from those heretofore obtained and composed of a series of acid resins and neutral resins amounting in the aggregate to six to ten per cent. of the oleo-resin extracted. These resins so supplement and modify the flavoring power of the citral of the oil that my product possesses a flavor and aroma more nearly resembling that of the fresh fruit.

I will now proceed to describe my process or method of extraction.

The peel is removed from the fruit, preferably with hand-knives, and is then coarsely ground in order that it may be in a condition to be formed into compact cakes, for which purpose an ordinary meat-chopper of the better class is found to answer the purpose. These cakes are then subjected to pressure, preferably between iron plates, to extract as much as possible of the water therefrom, for which purpose one may use an ordinary pair of pressure-plates, and if of metal some material should preferably be interposed which will, in addition to holding the pulp between the plates, operate to preserve it from contact with the metal. In practice I use a pair of metal plates having annealed steel surfaces, linen cloths being interposed between the ground peel and the face of the metal plates. After this step the pressed cakes are broken up and ground in a mill to a fine flour in order to burst all the oil-cells and separate both the essential oil and the resinous constituent. Preferably the grinding is effected from coarse to fine by employment of differentiated rolls, the corrugations in each set varying from coarse to fine. The resultant flour is gathered into suitable receptacles or conveyers, whereby it is delivered into the extractors, in which a volatile solvent—such as carbon disulfid, carbon tetrachlorid, ethyl ether, or petroleum ether—is forced by air-pressure, for which purpose I prefer to use a series of ordinary extractors discharging one into the other, with the result that the solvent takes up the oil constituent and the resinous matter. The product thus taken up is then run into a still, to which sufficient heat is applied to vaporize the solvent, leaving the oleo-resin as a residue. The latter is then subjected to any purification process, such as a heated-air current, to drive off any remaining traces of the solvent employed.

My process described differs essentially from any of the known processes employed for the extraction of the constituent oils from the peel of citrous fruits chiefly in the preliminary extraction of the contained water from the ground peel, the graduated pulverization thereof to thoroughly break up the oil-cells, followed by the employment of a volatile solvent to extract from the mass the constituent oil and resins. That these differences are substantial is evidenced by the fact that my process results in a new product, in that it contains, in addition to the essential oil usually obtained, a very much larger percentage of acid resins and an equally large percentage of neutral solid resins, the latter of which have never heretofore been obtained in any appreciable quantity, if at all, by any known process.

The aforesaid recent analyses of the product of my new process give the following results:

Concrete oleo-resin from orange-peel: citral and aldehydes, 1.28 per cent.; terpenes, 88.36 per cent., boiling at 175° centigrade under normal pressure; specific gravity, 0.8567 at 150° centigrade; optical rotation, 88.46°, and of the first ten per cent. of the distillate 90°; resins, both acid and neutral, 10.36 per cent.

Concrete oleo-resin from lemon-peel: citral and aldehydes, 6.83 per cent.; terpenes, 84.70 per cent., boiling at 172° centigrade under normal pressure; specific gravity, 0.864 at 150° centigrade; optical rotation 52.75°, and of the first ten per cent. of the distillate 54.25°; resins, both acid and neutral, 8.61 per cent.

These resins in both instances contain a series of acids to which no one formula, such as that used to designate the resins of known essential oils of this class, can be applied. They consist of one or more solid hydrocarbons or neutral resins and a series of aromatic to bitter (but not astringent) resin acids in about equal proportions. The solid hydrocarbons or neutral resins that were obtained in my analyses are not distillable with steam, but are all soluble in hot eighty-five-per-cent. alcohol. On being precipitated therefrom they crystallize on cooling and melt at 127° to 130° centigrade (orange oleo-resin) and 120° to 125° centigrade, (lemon oleo-resin.) That these resin acids above referred to form a series was determined by the results of treatment with eighty-five-per-cent. alcohol, hot and cold; also with ninety-five-per-cent. alcohol, both hot and cold, and alcoholic potash, both hot and cold, the acids and residual portions from these treatments being in one case almost liquid, in another waxy, and in the third one solid; but all were about equally aromatic and bitter (without being astringent) to the taste.

As is well known, it is the resinous constituent in essential oils of this class that mainly gives or at least dominates the flavoring power, and no essential oil or oleo-resin from the class of citrus fruits prior to that resulting from my process is known to contain so remarkably high a percentage of acid resinous constituent and none known to contain the solid hydrocarbons or neutral resins found in mine, the presence of which is further shown as well by the higher specific gravity as by the lesser degree of optical rotation, which is much lower than the normal for the essential oils or oleo-resins derived from the use of processes by "expression" and "distillation" commonly employed.

I have hereinabove stated at some length the several steps in detail constituting my new process in its best example and the means preferably employed to carry the same into effect; but I wish to repeat that its essential and characteristic steps are the employment of suitable means to effect the thorough breaking up of the oil-cells by pulverization in order to isolate therefrom the aforesaid constituent acid and neutral resins as well as the contained oil, and then extracting these from the pulpy mass by means of a volatile solvent of both; but the quality and quantity of the oleo-resin obtained will be better and the said essential steps facilitated if the contained water in the peel is removed after grinding and before pulverization, the surface of the pressure-plates covered by linen cloths, which operate both as a protection from the metal and as an absorbent of the water, and the employment of a series of extractors discharging one into the other, while the product will be purer if after evaporation of the volatile solvent in a heated still the resultant oleo-resin is subjected to a heated-air current to drive off any adhering traces of the volatile solvent employed.

Having thus described my invention, what I claim as new, and desire to secure by Letters Patent, is—

1. The herein-described process of extracting oleo-resin from the peel of citrus fruits, such as lemon and orange, which consists in thoroughly breaking up the oil-cells by successively grinding and pulverizing the same, then extracting the essential oil and flavoring-resins from the pulverized mass by means of a volatile solvent, and finally purifying the resultant product by evaporation of the solvent employed.

2. The herein-described process of extracting oleo-resin from the peel of citrus fruits, such as lemon and orange, which consists in coarsely grinding the peel and forming it into compact cakes, then drawing off the contained water by subjecting these cakes to pressure between pressure-plates protected by linen cloths, then pulverizing the mass to a fine flour, then submitting the pulverized mass, in suitable extractors, to the action of a volatile solvent of the oil and resin constituents, and withdrawing the solution; and finally separating the solvent from the extracted oleo-resin.

3. The herein-described process of extracting oleo-resin from the peel of citrus fruits, such as lemon and orange, which consists in coarsely grinding the peel, drawing off the water contained therein by pressure between surface-protected pressure-plates, pulverizing the mass to a flour, submitting the mass to the action of a volatile solvent of the constituent oil and resins, leading the solution to a suitable vaporizing vessel, and finally drawing off all adhering traces of the solvent by subjecting the isolated oleo-resin to a heated-air current.

In testimony whereof I have hereunto affixed my signature this 2d day of June, A. D. 1903.

EDWARD J. SHEEHAN.

Witnesses:
H. T. GULLMANN,
A. M. BIDDLE.